United States Patent Office 3,413,172
Patented Nov. 26, 1968

3,413,172
USE OF ENCAPSULATED FORMALDEHYDE IN BONDING RUBBER TO TEXTILE
Alan Paul Osborne, Wood End, near Atherstone, England, assignor to The Dunlop Company Limited, a British company
No Drawing. Filed Jan. 21, 1965, Ser. No. 427,106
Claims priority, application Great Britain, Feb. 12, 1964, 5,790/64
6 Claims. (Cl. 156—334)

ABSTRACT OF THE DISCLOSURE

Textile material, more particular rayon cords, are bonded to natural and synthetic rubber compositions by an in situ adhesive generated during vulcanization of such compositions from a polyhydric phenol and a component releasing formaldehye during vulcanization. The formaldehyde-releasing component is incorporated in the unvulcanized rubber composition in the form of micro-particles of paraformaldehyde at least partially encapsulated in a sheath of a polymeric material compatible with the rubber composition such as ethyl cellulose, polypropylene, cyclized natural rubber and the resinous condensate product of paratertiary butyl phenol and acetylene.

This invention relates to an improved method of bonding textile material to rubber and is an improvement in or modification of my co-pending U.S. application S.N. 323,883 which describes a method of bonding a textile material to a natural or synthetic rubber compound comprising incorporating in the said compound a polyhydric phenol, a stable formaldehyde-generator as therein defined and vulcanizing ingredients, applying the resulting rubber composition to the textile material and vulcanizing the assembly. By a stable formaldehyde-generator in that specification there is meant a compound which is substantially stable up to temperatures between 100 and 150° C.

According to the present invention a method of bonding a textile material to a natural or synthetic rubber composition comprises incorporating in the composition a polyhydric phenol and/or a resin derivative thereof, vulcanising ingredients and microencapsulated particles of an unstable formaldehyde-generator, as hereinafter defined, the said microencapsulated particles being microscopic particles each of which is individually provided with a sheath of a polymeric or resinous material over at least a substantial part of its surface applying the composition to the textile material and vulcanising the assembly in conditions in which formaldehyde is liberated from the microencapsulated particles. In the microencapsulated particles suitable for use in accordance with this invention, the sheath is adapted to permit the release of formaldehyde under predetermined conditions. Most suitably the predetermined conditions are the conditions in which the rubber composition is vulcanized. Preferably each particle is provided with a sheath over at least 50% of its surface, and an ideal particle will be provided with a sheath over 100% of its surface.

If the particle is provided with a sheath over less than 100% of its surface, the formaldehyde may be released slowly in the conditions in which the formaldehyde-generator decomposes. Some of the benefit of the present invention may be derived from such slow release of formaldehyde.

The preferred unstable formaldehyde-generators are polymers of formaldehyde, particularly paraformaldehyde. The formaldehyde-generator is present preferably in an amount of from 0.5 to 6 parts by weight per 100 parts of rubber in the composition.

The polymeric or resinous material of the sheath is preferably material which is not affected by the conditions in which a rubber composition is processed prior to vulcanization. For example the material is preferably not affected by the temperatures and physical forces normally used in the processes of mixing, milling, calendaring, extrusion, or moulding. However the material is preferably affected in an appropriate way by the conditions in which the rubber composition is vulcanized. For example the material may suitably melt at or about the temperature of vulcanization.

The sheath material is preferably compatible with the rest of the rubber composition.

Examples of suitable sheath materials are polymeric materials, which are soluble in an organic solvent, such as ethyl cellulose, cellulose nitrate, polypropylene, polyethylene, copolymers of ethylene and propylene, polycarbonate, polystyrene, cyclised natural rubber and the resinous condensate of paratertiary butyl phenol and acetylene known under the trade name "Koresin."

The microencapsulated particles may suitably be prepared in accordance with the method described in U.S. application S.N. 426,964 filed on Jan. 21, 1965, now abandoned, which describes a method of producing microencapsulated particles of a solid substance which comprises sub-dividing into droplets a feed stock comprising either a solution of a polymeric or resinous material in a volatile organic liquid having the said solid substance dispersed and/or dissolved therein or a dispersion in a dispersing medium of such a solution and mixing said droplets with steam in conditions in which steam condenses on the droplets and the volatile organic liquid is volatilized from each droplet while that droplet is free of external contact with a solid or bulk liquid.

The method of this invention results in substantially improved bonding of the textile materials to the rubber composition as compared to the method described in my said application S.N. 323,883. The use of the formaldehyde-generator in microencapsulated form reduces losses due to decomposition and volatilization which are normally encountered with formaldehyde-generators which are unstable at temperatures below about 150° C.

The preferred polyhydric phenols are the metadihydroxy phenols such as resorcinol; 1,5-naphthalene diol can also be used. Preformed resin derivatives of a polyhydric phenol with formaldehyde may be included. A partly condensed phenol/formaldehyde resin may be used alone or with a free phenol. The polyhydric phenol or derivative thereof is incorporated in the rubber composition preferably in an amount of from 0.5 part to 6 parts of phenol per 100 parts of rubber in the composition.

The textile material can consist of any of the well-known natural or synthetic textile materials. The invention is of particular value in the bonding of cords such as rayon and nylon cords. Improved adhesion is obtained by the method of the invention both when the textile material is untreated and also when the textile is previously treated with one of the conventional latex/resorcinol formaldehyde cord adhesives.

Rubber compositions which can be used include any of the conventional compositions based on natural rubber, butadiene/styrene rubbers, chloroprene rubbers, nitrile rubbers and blends thereof. It is desirable to incorporate the polyhydric phenol and the microencapsulated particles of the formaldehyde-generator prior to the addition of the vulcanization ingredients.

The invention is illustrated by the following examples, all parts being by weight:

EXAMPLE I

This example describes the bonding of nylon and rayon to a natural rubber composition containing microencapsulated particles of paraformaldehyde having cyclised natural rubber as the sheath material. The microencapsulated particles were prepared by the following method:

10 gm. of cyclised natural rubber was dissolved in methylene chloride to make about 100 mls. of solution. 10 gm. of paraformaldehyde was added to the solution which was stirred with a "Polytron" apparatus to disperse the paraformaldehyde and to reduce its particle size. Thus a slurry of paraformaldehyde in the polymer solution was formed. This slurry was sprayed through a laboratory spray drier under conditions such that the methylene chloride solvent had evaporated before the particles fell on to a collection tray. The solid product on the collection tray was microencapsulated particles of paraformaldehyde having cyclised natural rubber as the sheath material. The product contained 50% by weight of the sheath material.

The composition was made up as follows:

|  | Parts by weight |
| --- | --- |
| Natural rubber | 100.0 |
| General purpose furnace black | 46.0 |
| Zinc oxide | 6.0 |
| Resorcinol | 2.0 |
| Pine tar | 6.0 |
| Mineral oil | 4.0 |
| Stearic acid | 1.0 |
| N-nitroso-diphenylamine | 0.5 |
| N-cyclohexyl-2-benzothiazole sulphenamide | 0.7 |
| Microencapsulated paraformaldehyde | 2.2 |
| Sulphur | 2.6 |

The resorcinol was added at the internal mixing stage and the microencapsulated particles of paraformaldehyde were added on the mill immediately before the addition of sulphur. A control composition was prepared using the same ingredients except that the resorcinol and microencapsulated particles of paraformaldehyde were omitted.

The textile materials used were nylon cords of 840/2 denier and rayon cords of 1650/2 denier. An adhesive composition was made up using a styrene/vinyl pyridine/butadiene terpolymer latex containing polymerised styrene, vinyl pyridine, and butadiene in the ratio 15:15:70 and having a total solids content of 41 percent. The adhesive composition was as follows:

|  | Parts by weight | |
| --- | --- | --- |
|  | Wet | Dry |
| Terpolymer latex | 244 | 100 |
| Resorcinol | 11 | 11 |
| 37 percent formaldehyde solution | 16.2 | 6 |
| 10 percent sodium hydroxide solution | 3.0 | 0.3 |
| Water | 898.8 |  |

The adhesive composition was matured for 24 hours at a total solids content of 20 percent and then it was diluted to a total solids content of 10 percent. Samples of the textile materials were then dipped in the adhesive composition and were afterwards dried at 115° C. for 100 seconds. Other samples of the textile materials were used without being dipped in the adhesive composition.

All the samples of the textile materials were embedded over a 1 cm. length in the composition of this example and in the control composition, and each assembly was then vulcanized at a temperature of 148° C. for 25 minutes.

Each assembly was then subjected to the pull-through test described by J. O. Wood, Trans. I.R.I., 1956, 32, 1, 1. The figures quoted below are average values from at least ten individual results:

|  | Lbs./cm. pull-through | | | |
| --- | --- | --- | --- | --- |
|  | Nylon | | Rayon | |
|  | Dipped | Undipped | Dipped | Undipped |
| Composition of example | 28.8 | 21.1 | 28.5 | 7.4 |
| Control composition | 18.0 | 5.0 | 14.5 | 5.0 |

In the case of the dipped nylon and the dipped rayon samples, more than half of the test cords broke. This illustrates the remarkable strength of the bonding.

Similar experiments using a composition containing paraformaldehyde in non-microencapsulated form gave results which were lower than those for the composition of the example but higher than those of the control composition. The composition containing paraformaldehyde in non-microencapsulated form required excessive care in processing and the results obtained were not consistent.

EXAMPLE II

This example describes the bonding of nylon and rayon to a natural rubber composition containing microencapsulated particles of paraformaldehyde which had as the sheath material a resinous condensate of para-tertiary-butyl phenol and acetylene known under the trade name Koresin. The microencapsulated particles of paraformaldehyde which contained 50 percent by weight of the sheath material were prepared by the following method:

10 gm. of Koresin and 1 gm. of high molecular weight polymethyl methacrylate were dissolved in methylene chloride and 10 ml. benzene to give 150 ml. of solution. 10 gm. of paraformaldehyde was added to the solution, and microencapsulated particles were prepared as in Example II.

A composition was made up using the same ingredients as in Example I except that the microencapsulated paraformaldehyde referred to above was used.

The preparation of the cords and the testing of various assemblies were as described in the previous example and the results were as follows:

|  | Lb./cm. pull-through | | | |
| --- | --- | --- | --- | --- |
|  | Nylon | | Rayon | |
|  | Dipped | Undipped | Dipped | Undipped |
| Composition of example | 25.2 | 20.0 | 28.1 | 8.2 |
| Control composition | 18.0 | 5.0 | 14.5 | 5.0 |

In the case of the dipped rayon cords more than half of the test cords broke.

EXAMPLE III

This example describes the bonding of nylon and rayon to a natural rubber composition containing microencapsulated particles of paraformaldehyde having ethyl cellulose as the sheath material. The microencapsulated paraformaldehyde which contained 20 percent by weight of the sheath material was prepared in latex by the following method:

2 gm. of ethyl cellulose grade N100 was dissolved in 100 ml. of methylene chloride. 8 gm. of paraformaldehyde was dispersed in the solution using a "Polytron"

stirrer to form a slurry. An aqueous mixture of the following emulsifying agents was prepared:

| | Gm. |
|---|---|
| Aerosol O.T. | 6.25 |
| Calsolene oil | 7.5 |
| Polyvinyl alcohol | 1.25 |
| Sodium hexametaphosphate | 1.25 |

Aerosol O.T. is an alkyl aryl sulphonate surface active agent. The slurry was then added slowly to the emulsifying agents while stirring with the "Polytron" stirrer. In this way a stable emulsion was formed. The methylene chloride solvent was removed by blowing oil at the surface of the emulsion, thus forming a suspension. This suspension deposited a solid product which was filtered off. The product was 6.2 gms. of microencapsulated particles of paraformaldehyde having ethylene cellulose as the sheath material.

A composition was made up as in Example I except that 1.4 parts of the microencapsulated paraformaldehyde referred to above were used. The assemblies made up using this composition were tested as in the previous examples and gave the following results:

| | Lb./cm. pull-through | | | |
|---|---|---|---|---|
| | Nylon | | Rayon | |
| | Dipped | Undipped | Dipped | Undipped |
| Composition as in example | 28.4 | 18.3 | 28.8 | 8.5 |
| Control composition | 18.0 | 5.0 | 14.5 | 5.0 |

In the case of the dipped nylon and dipped rayon samples, more than half of the test cords broke.

EXAMPLE IV

This example describes the bonding of nylon cords to a natural rubber composition containing microencapsulated particles of paraformaldehyde having polycarbonate as the sheath material. The microencapsulated particles of paraformaldehyde were prepared as follows:

1 gm. of finely ground paraformaldehyde was dispersed in 100 cc. of a 2% solution of polycarbonate in chloroform. The dispersion was supplied to the open spray during apparatus described in U.S. application S.N. 426,964 filed Jan. 21, 1965. Steam at 110° C. was used in the apparatus. Microencapsulated particles of paraformaldehyde were collected in a dry warm bucket.

A rubber composition was made up as in Example I except that the microencapsulated paraformaldehyde prepared above was used.

Samples of undipped nylon cords were embedded in samples of the rubber composition as in Example I. The pull-through test gave a value of 18.6 lbs./cm. as compared to 5.0 lbs./cm. for a control composition.

Having now described my invention, what I claim is:

1. A method of bonding a textile material to a natural or synthetic rubber composition comprising incorporating in the composition a polyhydric phenol and/or a resin derivative thereof, vulcanizing ingredients and microencapsulated particles of a unstable formaldehyde generator, the said microencapsulated particles being microscopic particles each of which is individually provided with a sheath of a polymeric or resinous material over at least a substantial part of its surface, the sheath being rupturable under the conditions of vulcanization but not under the temperatures and physical forces to which a rubber composition is normally subjected prior to vulcanization, applying the composition to the textile material and vulcanizing the assembly.

2. A method according to claim 1 wherein each microencapsulated particle is provided with a sheath over at least 50 percent of its surface.

3. A method according to claim 1 wherein the unstable formaldehyde generator is paraformaldehyde.

4. A method according to claim 1 wherein the formaldehyde generator is present in an amount of from 0.5 to 6 parts by weight per 100 parts of rubber in the composition.

5. A method according to claim 1 wherein the polyhydric phenol or derivative thereof is present in an amount of from 0.5 to 6 parts by weight of phenol per 100 parts of rubber in the composition.

6. A method according to claim 1 wherein the textile material is previously treated with a latex/resorcinol/formaldehyde cord adhesive.

References Cited

UNITED STATES PATENTS

| 2,690,879 | 10/1954 | Snyder. | |
|---|---|---|---|
| 2,907,682 | 10/1959 | Zichel. | |
| 2,927,051 | 3/1960 | Buckwalter et al. | 156—110 |
| 3,018,207 | 1/1962 | Danielson | 156—110 |
| 3,103,756 | 9/1963 | Langan et al. | |
| 3,111,569 | 11/1963 | Rubenstein. | |
| 3,194,294 | 7/1965 | Van Gils | 156—110 |
| 3,212,955 | 10/1965 | Kaizerman | 156—110 |
| 3,256,137 | 6/1966 | Danielson | 156—110 |
| 3,036,980 | 5/1962 | Dunham et al. | 260—31.4 |
| 3,278,333 | 10/1966 | Titzmann | 117—138.8 |

OTHER REFERENCES

Barron, H.: "Modern Rubber Chemistry," Van Nostrand, New York City, 1947, pp. 72–75.

EARL M. BERGERT, *Primary Examiner.*

C. B. COSBY, *Assistant Examiner.*